S. SHAPIRO.
REFRIGERATING COVER FOR MILK CANS.
APPLICATION FILED SEPT. 22, 1911.
1,047,997.
Patented Dec. 24, 1912.
2 SHEETS—SHEET 1.
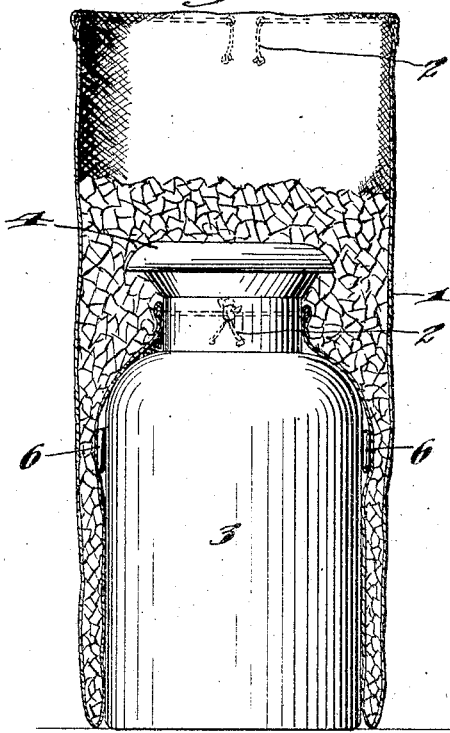
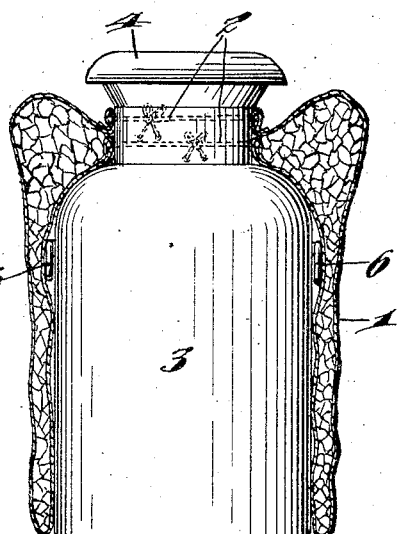
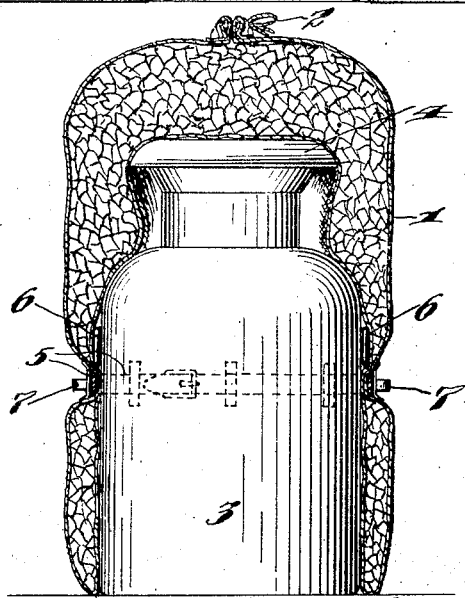
WITNESSES:
INVENTOR
BY Samuel Shapiro,
Joshua R. H. Potts
Attorney S. SHAPIRO.
REFRIGERATING COVER FOR MILK CANS.
APPLICATION FILED SEPT. 22, 1911.
1,047,997.
Patented Dec. 24, 1912.
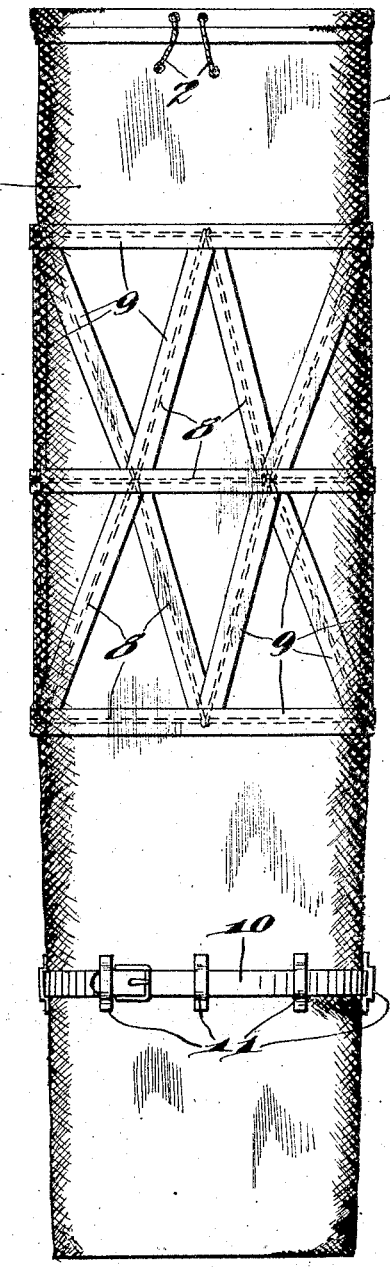
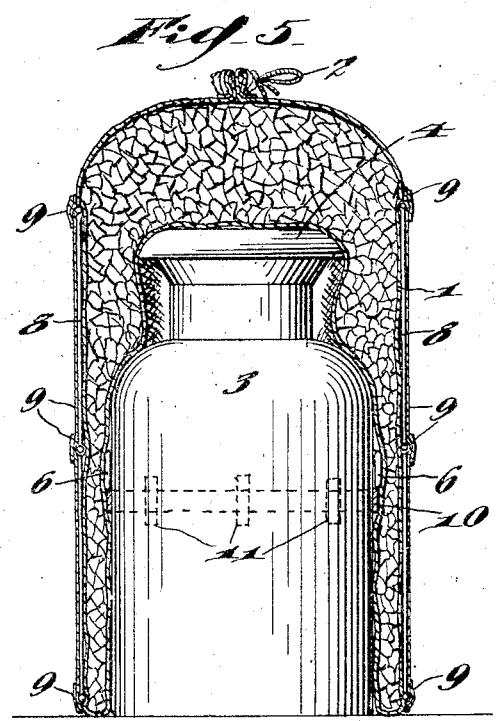
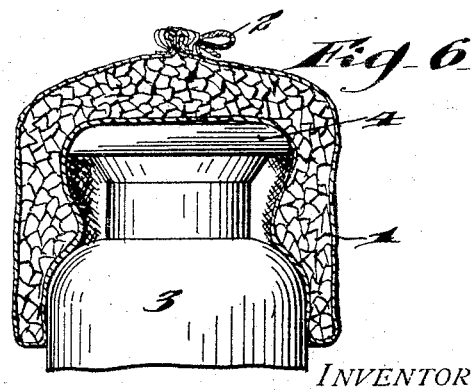

UNITED STATES PATENT OFFICE.

SAMUEL SHAPIRO, OF PHILADELPHIA, PENNSYLVANIA.

REFRIGERATING-COVER FOR MILK-CANS.

1,047,997.

Specification of Letters Patent. Patented Dec. 24, 1912.

Application filed September 22, 1911. Serial No. 650,713.

*To all whom it may concern:*

Be it known that I, SAMUEL SHAPIRO, a citizen of the United States, residing at Philadelphia, in the county of Philadelphia and State of Pennsylvania, have invented certain new and useful Improvements in Refrigerating - Covers for Milk - Cans, of which the following is a specification.

My invention relates to improvements in refrigerating covers for milk cans, the object of the invention being to provide a flexible cover which may be positioned on a milk can, and which is adapted to contain ice or other refrigerant to maintain the contents of the can at a low temperature.

A further object is to provide a cover of this character which is adapted to cover the entire can or part thereof, and which is capable of use in connection with various styles of milk cans and other receptacles, and is adapted to efficiently perform its refrigerating function.

A further object is to provide a cover of waterproof flexible material which is in the form of a sack turned backward upon itself, whereby an annular compartment is formed for ice or other refrigerating medium around the can.

With these and other objects in view, the invention consists in certain novel features of construction and combinations and arrangements of parts, as will be more fully hereinafter described and pointed out in the claims.

In the accompanying drawings: Figure 1, is a view in longitudinal section illustrating one form of my improvements. Figs. 2, 3, 4, 5, and 6, are views illustrating other forms of my improvements.

1, represents my improved cover which is of flexible waterproof material, and while the covers of the several modifications differ slightly in structure, it is of the same general composition, and for this reason I use the same reference character 1 to indicate the cover in all of the different forms. In the structure shown in Fig. 1, this cover is made with both ends open, and each end provided with a draw string 2. One of these draw strings is secured around the neck of the can 3, and the cover turned upon itself so as to form a compartment all about the milk can. This compartment is filled with ice over the top 4 of the can, and then the upper draw string draws the bag tight, and it is ready for shipment.

In the modification shown in Fig. 2, the bag is precisely like that shown in Fig. 1, except that it is shorter, so that both draw strings are secured around the neck of the can. This provides an ice compartment around the can, yet leaves the cover exposed, so that it may be removed and replaced and access had to the contents of the can without disturbing the refrigerating cover.

In Fig. 3, I illustrate a form of bag having a closed end over the can top 4, and in addition, I provide around said bag a strap 5 which is tightly drawn beneath the handles 6 of the can 3, so as to secure the cover on the can. This strap 5 is provided with handles 7 to facilitate the handling of the can in shipment.

Fig. 4, illustrates a modified form of cover as extended, while Fig. 5 shows the same in section on a can. In this modification the cover is provided with a reinforcing frame 8, preferably of wire inclosed by tapes 9, so as to hold the cover in cylindrical form about the can as shown in Fig. 5. In this form of cover, a strap 10 is located under tabs 11 on the inner face of the cover, and is adapted to be secured around the can to hold the cover in place.

Fig. 6 shows a modification in which the cover is very much shortened, and is only positioned around the upper portion of the can. In other respects it is similar to the structure shown in Fig. 1.

In all of the several forms above described, I employ the same general construction, namely, a flexible bag-like device which when turned upon itself forms an annular compartment for a refrigerating medium, the portion turned in being tapered and as it is flexible and readily conforms to the shape of the receptacle, it occupies but the minimum of space thereon. The invention is therefore capable of a wide range of utility, and while I preferably employ canvas or other heavy fabric so treated as to make it waterproof, and employ the same in connection with a milk can, I would have it understood that the material may be changed and the device may be used in connection with any receptacle for which it may be adapted.

My cover is designed to keep the contents of the can cool during transit or shipment, and to distinguish my invention from that class of covering devices which are designed to cool receptacles while in the act of dispensing the contents thereof, I shall refer in the claims to the cover as a cover for cans during shipment, and would have it understood that this term is employed for the purpose stated, and is not a mere functional statement, but by reason of its structure it is capable of this function, and is designed for such a function which is not true of devices above referred to. I therefore do not limit myself to the precise details set forth, but consider myself at liberty to make such changes and alterations as fairly fall within the spirit and scope of the appended claims.

Having thus described my invention, what I claim as new and desire to secure by Letters Patent is:

1. A cover for milk cans during shipment comprising a tubular member formed of flexible water proof material adapted to be turned upon itself to form an annular jacket space to contain a refrigerant, the portion constituting the inner wall of said jacket space being tapered, and means for closing the upper end of the outer wall portion, substantially as described.

2. A cover for milk cans during shipment comprising a tubular member formed of flexible water proof material adapted to be turned upon itself to form inner and outer wall portions, said wall portions together forming a jacket to contain a refrigerant, the portion constituting the inner wall of said jacket space being tapered, reinforcing and stiffening members secured to the outer wall portion, and means for closing the upper end of the outer wall portion, substantially as described.

3. A cover for milk cans during shipment comprising a tubular member formed of flexible water proof material adapted to be turned upon itself to form inner and outer wall portions, said wall portions together forming a jacket space to contain a refrigerant, the portion constituting the inner wall of said jacket space being tapered, both ends of said member being open, and a draw string in each of said ends, substantially as described.

In testimony whereof I have signed my name to this specification in the presence of two subscribing witnesses.

SAMUEL SHAPIRO.

Witnesses:
  R. H. KRENKEL,
  CHAS. E. POTTS.